(12) United States Patent
Marukame et al.

(10) Patent No.: US 11,586,887 B2
(45) Date of Patent: Feb. 21, 2023

(54) NEURAL NETWORK APPARATUS

(71) Applicant: Kabushiki Kaisha Toshiba, Minato-ku (JP)

(72) Inventors: Takao Marukame, Chuo (JP);
Tetsufumi Tanamoto, Kawasaki (JP);
Yoshifumi Nishi, Yokohama (JP);
Kumiko Nomura, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 839 days.

(21) Appl. No.: 16/556,362

(22) Filed: Aug. 30, 2019

(65) Prior Publication Data

US 2020/0302274 A1 Sep. 24, 2020

(30) Foreign Application Priority Data

Mar. 18, 2019 (JP) .............................. JP2019-049872

(51) Int. Cl.
*G06N 3/063* (2006.01)
(52) U.S. Cl.
CPC ........... *G06N 3/063* (2013.01); *G06N 3/0635* (2013.01)
(58) Field of Classification Search
CPC ...................................................... G06N 3/063
See application file for complete search history.

(56) References Cited

U.S. PATENT DOCUMENTS

| 10,175,947 | B1 | 1/2019 | Marukame et al. |
| 2015/0178619 | A1* | 6/2015 | Nishitani ................ G06N 3/04 706/26 |
| 2017/0364791 | A1 | 12/2017 | Miyashita et al. |
| 2018/0247179 | A1 | 8/2018 | Brew et al. |
| 2019/0042931 | A1 | 2/2019 | Busch et al. |
| 2020/0026496 | A1 | 1/2020 | Marukame et al. |
| 2021/0288357 | A1* | 9/2021 | Kuriki ................ H01M 10/482 |

FOREIGN PATENT DOCUMENTS

| JP | 2017-228295 A | 12/2017 |
| JP | 2019-053563 A | 4/2019 |
| JP | 2020-13398 A | 1/2020 |
| WO | WO 2015/001697 A | 1/2015 |

OTHER PUBLICATIONS

Boybat, I, et al., "Neuromorphic computing with multi-memristive synapses", Nature Communications, vol. 9, 2018, 12 pages.
(Continued)

*Primary Examiner* — Douglas King
(74) *Attorney, Agent, or Firm* — Oblon, McClelland, Maier & Neustadt, L.L.P.

(57) ABSTRACT

According to an embodiment, a neural network apparatus includes a plurality of neuron circuits, each including an integration circuit, a firing circuit, and a secondary battery. The integration circuit is configured to output an integral signal obtained by integrating input signals. The firing circuit is configured to generate, in accordance with the integral signal, a pulse signal to be transmitted to the neuron circuit provided at a subsequent layer. The secondary battery is configured to supply the firing circuit with drive electric power used for generating the pulse signal.

13 Claims, 7 Drawing Sheets

(56) References Cited

OTHER PUBLICATIONS

Sebastian, A, et al., "Tutorial: Brain-inspired computing using phase-change memory devices", Journal of Applied Physics 124, 111101 (2018), 16 pages.
Wozniak, S, et al., "Neuromorphic Architecture with 1M Memristive Synapses for Detection of Weakly Correlated Inputs", IEEE Transactions on Circuits and Systems—II: Express Briefs, vol. 64, issue 11, Nov. 2017, 5 pages.
Wang, W, et al., "Learning of spatiotemporal patterns in a spiking neural network with resistive switching synapses", Science Advances 2018, vol. 4, No. 9:eaat4752, American Association for the Advancement of Science, 9 pages.
Nishitani, Y, et al., "Three-terminal ferroelectric synapse device with concurrent learning function for artificial neural networks", Journal of Applied Physics 111, 124108 (2012), Jun. 22, 2012, 7 pages.
Wu, X, et al., "A CMOS Spiking Neuron for Brain-Inspired Neural Networks with Resistive Synapses and In Situ Learning", IEEE Transactions on Circuits and Systems—II: Express Briefs, vol. 62, No. 11, Nov. 2015, 5 pages.
Sasaki, A, et al., "Fabrication of solid-state secondary battery using semiconductors and evaluation of its charge/discharge characteristics", Japanese Journal of Applied Physics, 57, 041201 (2018), Mar. 3, 2018, 6 pages.

* cited by examiner

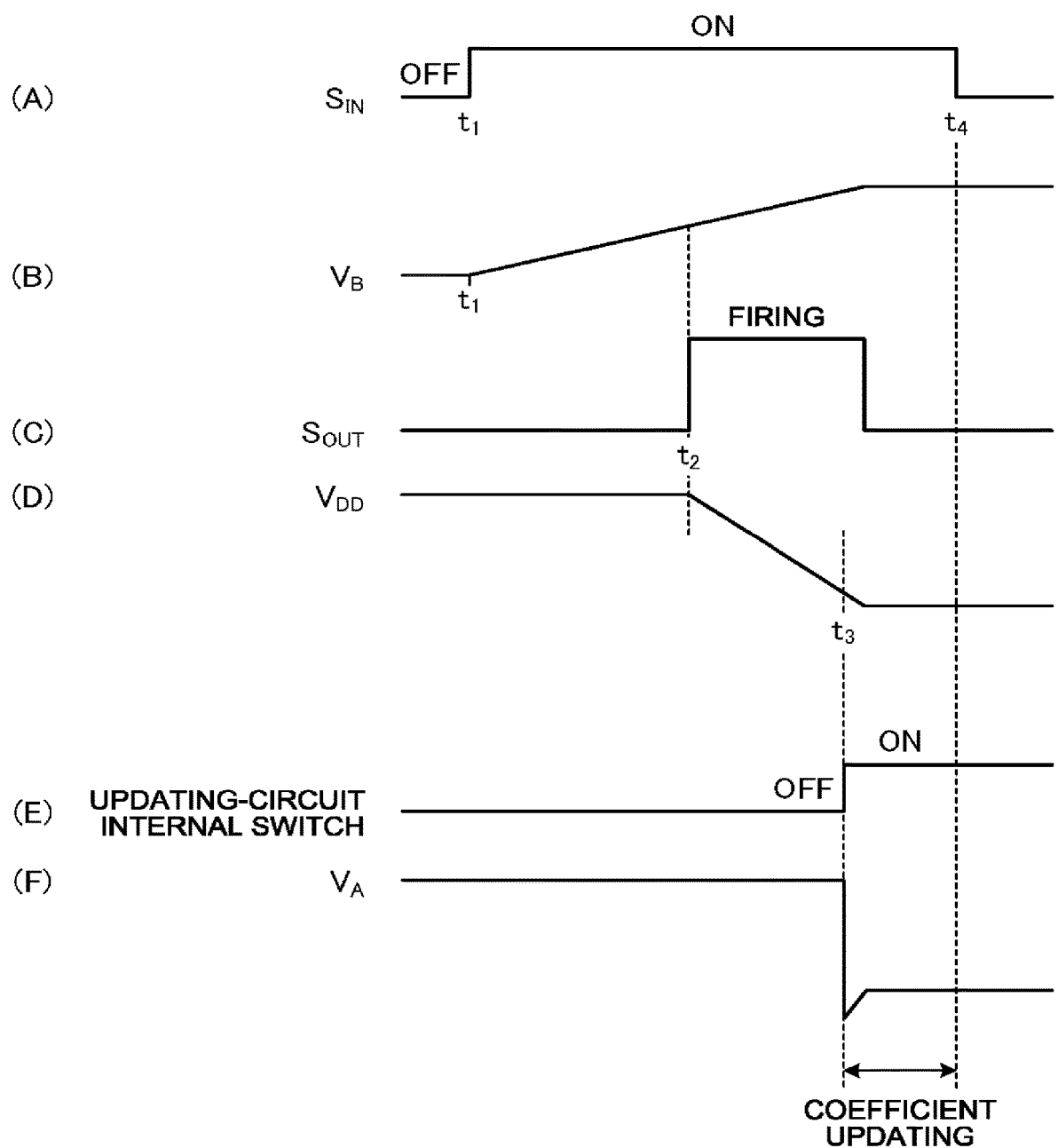

NEURAL NETWORK APPARATUS

CROSS-REFERENCE TO RELATED APPLICATIONS

This application is based upon and claims the benefit of priority from Japanese Patent Application No. 2019-049872, filed on Mar. 18, 2019, the entire contents of which are incorporated herein by reference.

FIELD

Embodiments described herein relates generally to a neural network apparatus.

BACKGROUND

In recent years, techniques to provide a neuromorphic processor using a neural network implemented in the form of hardware have been proposed. The neuromorphic processor includes artificial neurons. Each of the artificial neurons receives a signal from another neuron via a synapse and fires when the received signal exceeds a threshold. The artificial neuron consumes electric power for the firing.

A neuron of a human body is considered to generate energy from sugar and oxygen transported thereto by blood. That is, each neuron functions also as an energy source that generates electric power. For simulation of a brain, it is thought preferable that a neuromorphic processor include energy sources in a form similar to neurons of a human body.

In addition, it is presumed that a brain uses a learning rule called spike-timing-dependent plasticity (STDP). STDP is a learning rule by which synaptic strength is changed at a timing of the firing of the neuron. Conventionally, a neuromorphic processor configured to simulate the STDP has, as components different from artificial neurons, paths for providing feedback of a timing of the neuron firing to synapses. It is presumed, however, that the brain in a human body does not have feedback paths differing from neurons. Furthermore, when a neuromorphic processor is provided with feedback paths apart from artificial neurons, the circuit size of the processor is likely to become larger.

BRIEF DESCRIPTION OF THE DRAWINGS

FIG. 7 is a diagram illustrating signal waveforms of the neuron circuit and the synapse circuit according to the modification.

DETAILED DESCRIPTION

According to an embodiment, a neural network apparatus includes a plurality of neuron circuits, each including an integration circuit, a firing circuit, and a secondary battery. The integration circuit is configured to output an integral signal obtained by integrating input signals. The firing circuit is configured to generate, in accordance with the integral signal, a pulse signal to be transmitted to the neuron circuit provided at a subsequent layer. The secondary battery is configured to supply the firing circuit with drive electric power used for generating the pulse signal.

The following describes a neural network apparatus 10 according to an embodiment. The neural network apparatus 10 according to the embodiment is capable of holding energy sources in a form similar to neurons of a human body. Furthermore, the neural network apparatus 10 according to the embodiment is capable of feeding back a timing of the neuron firing without feedback paths apart from the neurons.

Figure 1:
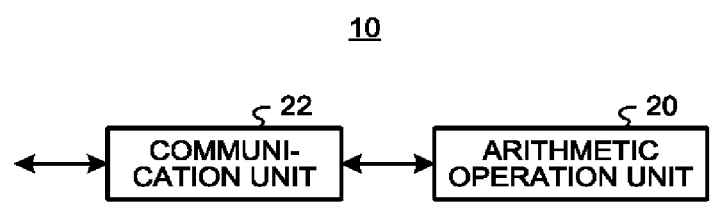
FIG. 1 is a block diagram illustrating a neural network apparatus according to an embodiment.

FIG. 1 is a diagram illustrating the structure of the neural network apparatus 10 according to the embodiment. The neural network apparatus 10 includes an arithmetic operation unit 20 and a communication unit 22. The arithmetic operation unit 20 and the communication unit 22 may be implemented on one semiconductor device or implemented on a plurality of semiconductor devices in a dispersed manner.

The neural network apparatus 10 receives input data from an external apparatus. The neural network apparatus 10 executes arithmetic operation processing on the received input data in accordance with a neural network. The neural network apparatus 10 transmits, to an external apparatus, output data obtained as a result of the arithmetic operation processing according to the neural network.

The arithmetic operation unit 20 uses a hardware circuit to execute ordinary arithmetic operation processing based on the neural network. The arithmetic operation unit 20 executes, for example, various kinds of information processing as the ordinary arithmetic operation processing based on the neural network, such as pattern recognition processing, data analysis processing, and control processing.

The arithmetic operation unit 20 also executes learning processing in parallel to the ordinary arithmetic operation processing. The arithmetic operation unit 20 changes a plurality of coefficients (weights) given to the neural network through the learning processing so as to more appropriately execute the ordinary arithmetic operation processing. For example, the arithmetic operation unit 20 changes the coefficients through learning processing that simulates the STDP learning rule.

The communication unit 22 transmits and receives data to/from an external apparatus. Specifically, from the external apparatus, the communication unit 22 receives input data on which arithmetic operation processing is to be performed. To the external apparatus, the communication unit 22 transmits output data that is the result of the arithmetic operation processing.

Figure 2:
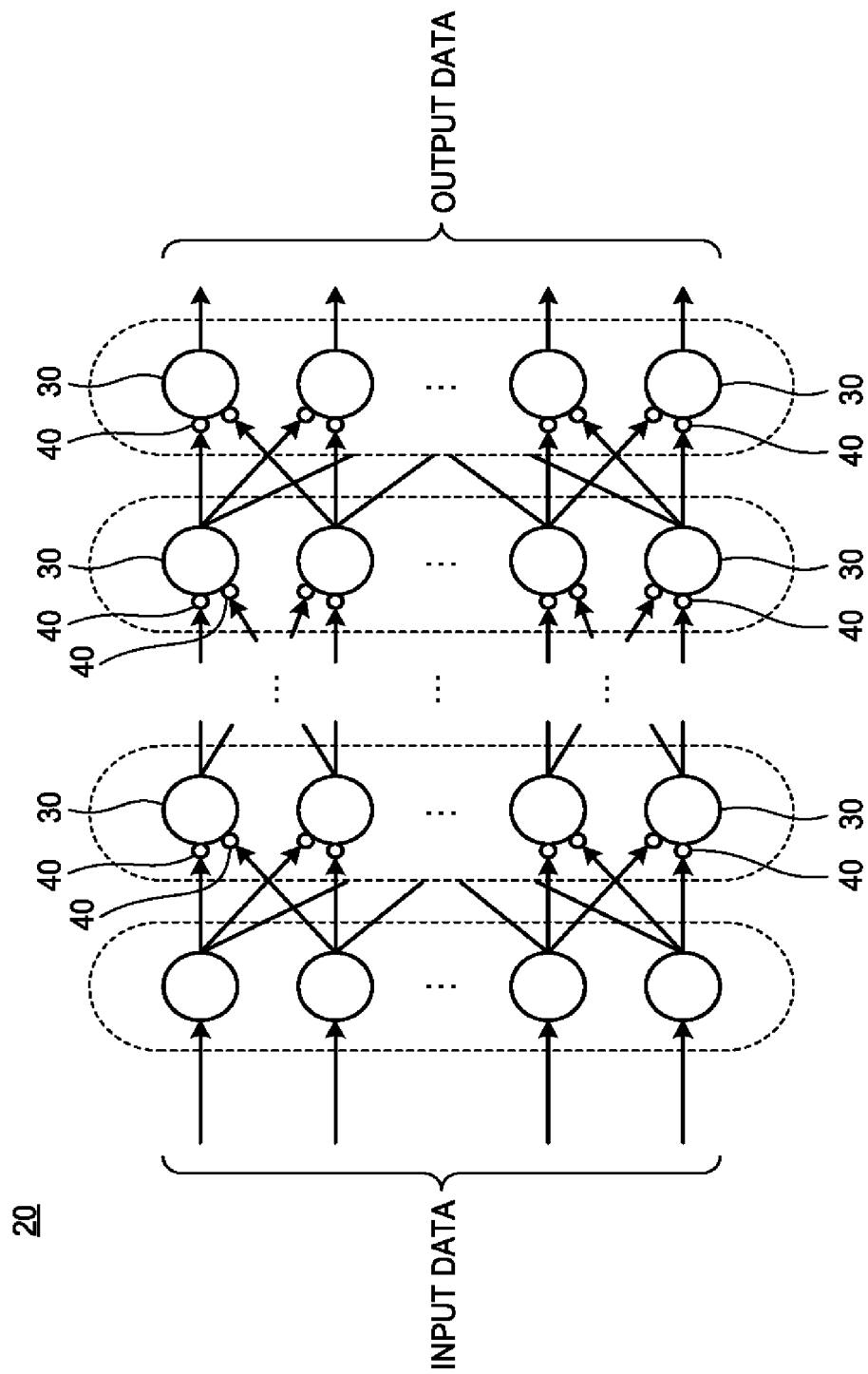
FIG. 2 is a block diagram illustrating an arithmetic operation unit.

FIG. 2 is a diagram illustrating the structure of the arithmetic operation unit 20. The arithmetic operation unit 20 executes arithmetic operation processing on the received input data in accordance with the neural network.

The neural network has a plurality of layers. Each of those layers performs specific arithmetic operation and processing on received data. Each of the layers in the neural network includes a plurality of nodes. Each of the nodes corresponds to a neuron. The number of nodes included in a single layer may be different among the layers.

The neural network also includes links that propagate individual signals from each node included in one layer to all nodes in a subsequent layer. Each of the links corresponds to a synapse. Each of the links is assigned a coefficient. The coefficient corresponds to synaptic strength, which represents efficiency of transmitting signals.

The arithmetic operation unit 20 includes a plurality of neuron circuits 30 as functions corresponding to the respective nodes in the form of hardware. The arithmetic operation unit 20 also includes a plurality of synapse circuits 40 implemented as functions corresponding to the respective links in the forms of hardware.

Each of the neuron circuits 30 is associated with two or more of the synapse circuits 40. The two or more synapse circuits 40 associated with a single neuron circuit 30 in one layer have a one-to-one correspondence with two or more of the neuron circuits 30 in a preceding layer. That is, the number of synapse circuits 40 associated with a single neuron circuit 30 is the same as the number of neuron circuits 30 in the preceding layer.

Each of the neuron circuits 30 acquires two or more input signals from the two or more synapse circuits 40 associated with the corresponding neuron circuit 30. Each of the neuron circuits 30 fires based on the acquired two or more input signals. Upon firing, each of the neuron circuits 30 generates a pulse signal.

Each of the synapse circuits 40 is assigned a coefficient. Each of the synapse circuits 40 receives a pulse signal generated by the neuron circuit 30 of a preceding layer. Each of the synapse circuits 40 generates an input signal having a value obtained by multiplying the received pulse signal with the assigned coefficient. Each of the synapse circuits 40 gives the generated input signal to the corresponding neuron circuit 30 (that is, the neuron circuit 30 of a subsequent layer).

Each of the neuron circuits 30 updates coefficients assigned to the corresponding synapse circuits 40 by internally providing feedback of a timing of the pulse signal. Specifically, upon generating a pulse signal, the neuron circuit 30 updates a coefficient of a specified synapse circuit 40, which is one of the corresponding synapse circuits 40 and has given the input signal to this neuron circuit 30.

An initial layer in the neural network receives input data from an external apparatus and gives an input signal, which corresponds to the input data, to the neuron circuits 30 of the next (subsequent) layer. Thus, the initial layer in the neural network does not need to be associated with synapse circuits 40 provided at an input side of the initial layer. The initial layer in the neural network does not execute arithmetic operations or processing.

Figure 3:
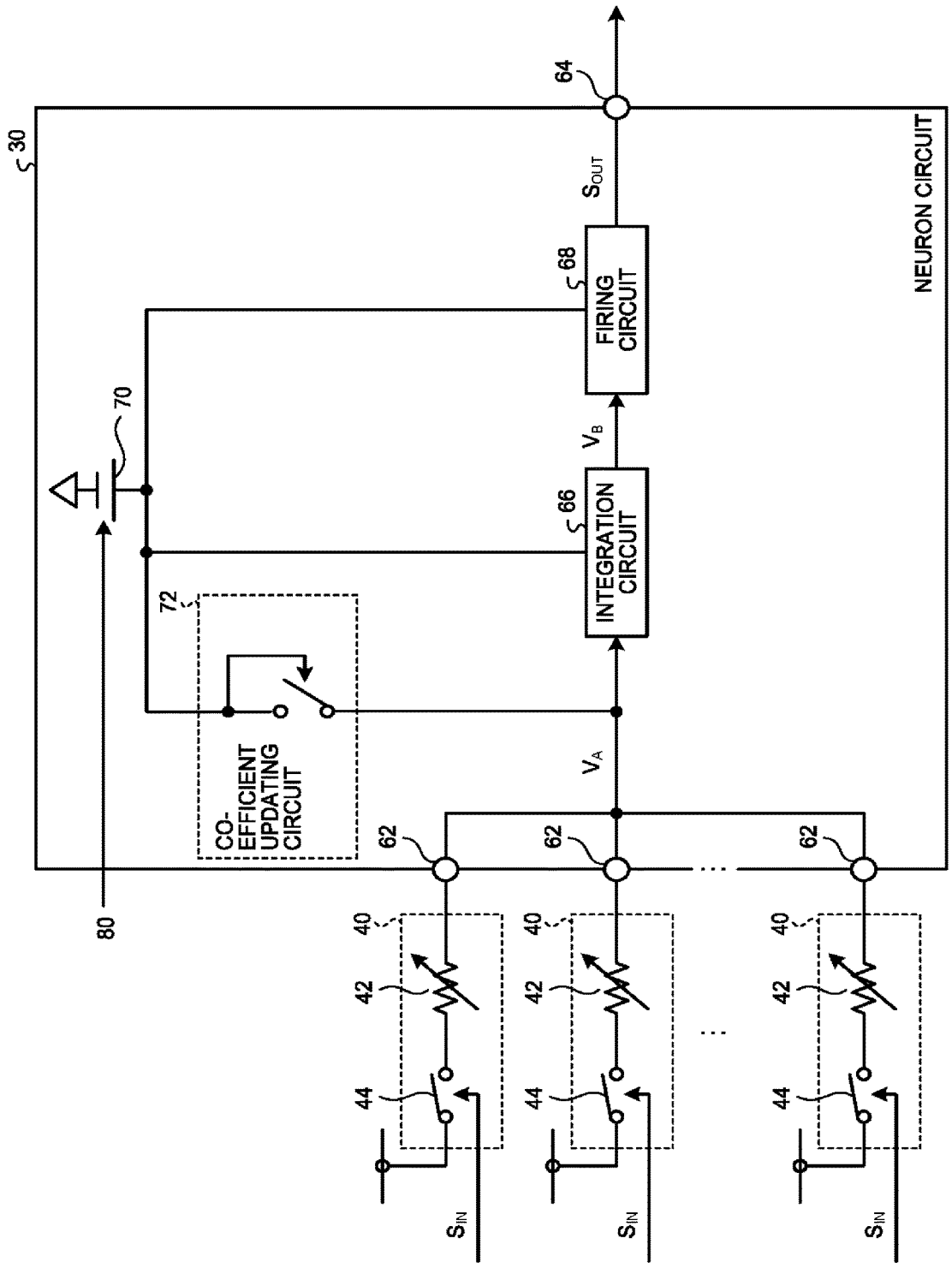
FIG. 3 is a block diagram illustrating a neuron circuit and synapse circuits.

FIG. 3 is a diagram illustrating respective circuit structures of the neuron circuit 30 and two or more synapse circuits 40 associated with the neuron circuit 30.

Two or more of the synapse circuits 40 are associated with an input side of one neuron circuit 30. Each of those two or more synapse circuits 40 gives an input signal to the corresponding neuron circuit 30, where the input signal has a value obtained by multiplying a pulse signal received from the neuron circuit 30 of a preceding layer with the assigned coefficient.

The synapse circuit 40 includes a resistance change memory element 42 and a switch 44.

The resistance change memory element 42 is a variable resistance, whose conductance varies in accordance with applied voltage. The conductance of the resistance change memory element 42 corresponds to a coefficient that has been assigned to the synapse circuit 40. The resistance change memory element 42 may be, for example, a resistive element that is used in a resistive random access memory (ReRAM) or may be a memristor.

The switch 44 applies specific constant voltage to the resistance change memory element 42 at the time when a pulse signal generated by the neuron circuit 30 of a preceding layer is received. For example, the switch 44 applies the voltage to the resistance change memory element 42 for a specific period starting from the time when it receives the pulse signal. The voltage applied by the switch 44 is small enough to keep the conductance of the resistance change memory element 42 unchanged.

The synapse circuit 40 is capable of feeding, as an input signal, current that flows through the resistance change memory element 42 to the corresponding neuron circuit 30. The current flowing through the resistance change memory element 42 represents a value obtained by multiplying voltage applied by the switch 44 to the resistance change memory element 42 with the conductance of the resistance change memory element 42. Thus, the synapse circuit 40 is capable of feeding, to the associated neuron circuit 30, the input signal that has a value obtained by multiplying the received pulse signal with the assigned coefficient.

The neuron circuit 30 includes two or more input terminals 62, an output terminal 64, an integration circuit 66, a firing circuit 68, a secondary battery 70, and a coefficient updating circuit 72.

The two or more input terminals 62 are connected to the two or more synapse circuit 40 that are provided in association with the neuron circuit 30. Those two or more input terminals 62 acquire two or more input signals from the associated two or more synapse circuits 40. For example, each of the two or more input terminals 62 receives, as an input signal, current that flows through the resistance change memory element 42 of the corresponding synapse circuit 40. In this case, the two or more input terminals 62 are connected internally.

The integration circuit 66 performs integration on two or more input signals acquired through the two or more input terminals 62. The integration circuit 66 adds up the two or more input signals and performs time-integration on the sum. The integration circuit 66 then outputs an integral signal indicating a resulting value of the time-integration.

Specifically, the integration circuit 66 outputs the integral signal having a value obtained by adding up the current applied through the two or more input terminals 62 and performing time-integration on the sum of the current. In this case, the integration circuit 66 may be, for example, an analog integration circuit formed by connecting a resistor, a capacitor, and an operation amplifier. Such an analog integration circuit accumulates, in the capacitor, total current obtained by adding up current that flows through the two or more input terminals 62 and outputs, as the integral signal, a value indicating voltage generated across the capacitor.

The firing circuit 68 generates, in accordance with the integral signal output from the integration circuit 66, a pulse signal to be transmitted to the neuron circuits 30 of a subsequent layer. The firing circuit 68 generates a pulse signal of a prescribed pulse width when the integral signal is equal to or greater than a predetermined value or is equal to or less than a predetermined value. In a case where the integral signal is a voltage signal, the firing circuit 68 may be a comparator that compares input voltage with reference voltage.

Alternatively, the firing circuit 68 may be a circuit that generates a pulse signal with a higher probability as the integral signal has a higher value.

The secondary battery 70 internally accumulates electric power and generates power supply voltage. The secondary battery 70 supplies the integration circuit 66 with driving electric power for integration operation. The secondary battery 70 supplies the firing circuit 68 with driving electric power used for generating a pulse signal. The secondary battery 70 supplies the power supply voltage to the integration circuit 66 and the firing circuit 68.

The secondary batteries 70 are provided separately in the individual neuron circuits 30. The arithmetic operation unit 20 does not include a single secondary battery 70 that is provided in common to two or more of the neuron circuits 30. By such structure, the secondary batteries 70 are capable of functioning as energy sources in the same manner as neurons in a human body.

The secondary battery 70 has an energy capacity sufficient to enable the integration circuit 66 and the firing circuit 68 to adequately operate. The secondary battery 70 has a discharge characteristic such that a voltage drop of a certain amount occurs when the firing circuit 68 has generated a pulse signal. That is, the power supply voltage generated by the secondary battery 70 decreases when the pulse signal is output from the firing circuit 68. However, the secondary battery 70 has an energy capacity such that electric power of at least a certain amount can remain therein after the firing circuit 68 generates a pulse signal. More specifically, even after the firing circuit 68 generates a pulse signal, the secondary battery 70 has electric power left therein that allows the conductance of the resistance change memory element 42 to change.

The secondary battery 70 is formed on, for example, a semiconductor substrate. The secondary battery 70 may have a structure of a multi-layered thin film formed by solid electrolyte and metal, which is described in, for example, Atsuya Sasaki et al., "Fabrication of solid-state secondary battery using semiconductors and evaluation of its charge/discharge characteristics", Japanese Journal of Applied Physics 57. 041201 (2018), 3 Mar. 2018.

The secondary battery 70 is charged by an external charge circuit 80. Charging of the secondary battery 70 by the charge circuit 80 is described later with reference to FIG. 5.

In accordance with decrease in the power supply voltage of the secondary battery 70 as a result of generation of a pulse signal by the firing circuit 68, the coefficient updating circuit 72 updates the coefficient assigned to the specified synapse circuit 40, which is one of the corresponding synapse circuits 40 and has given the input signal. The specified synapse circuit 40 is a circuit that has received the pulse signal from the neuron circuit 30 of a preceding layer.

When the power supply voltage is less than or equal to a predetermined threshold or is greater than or equal to a predetermined threshold, the coefficient updating circuit 72 updates the coefficient that has been assigned to the specified synapse circuit 40. More specifically, when the power supply voltage is less than or equal to a predetermined threshold or is greater than or equal to a predetermined threshold, the coefficient updating circuit 72 applies the power supply voltage to the resistance change memory element 42 included in the specified synapse circuit 40.

Current (electric charge) of a certain amount flows through the resistance change memory element 42 when the power supply voltage generated by the secondary battery 70 is applied to the resistance change memory element 42. As a result, the conductance of the resistance change memory element 42 changes. Accordingly, the coefficient updating circuit 72 is able to update the coefficient assigned to the specified synapse circuit 40 by applying power supply voltage to the resistance change memory element 42 in the specified synapse circuit 40.

The coefficient updating circuit 72 may be a switching circuit that short-circuits a power supply voltage generating terminal of the secondary battery 70 and the input terminal 62 with each other when the power supply voltage is less than or equal to a predetermined threshold or is greater than or equal to a predetermined threshold. Such a switching circuit disconnects the input terminal 62 from the power supply voltage generating terminal of the secondary battery 70 when the power supply voltage is greater than a predetermined threshold or is less than a predetermined threshold. A switching circuit that operates in the above manner can be implemented in the form of a MOS-FET that have a drain and a gate short-circuited with each other and that is provided between the power supply voltage generating terminal of the secondary battery 70 and the input terminal 62. Accordingly, when the power supply voltage is less than or equal to a predetermined threshold or is greater than or equal to a predetermined threshold, the coefficient updating circuit 72 can apply the power supply voltage to the resistance change memory element 42 included in the specified synapse circuit 40.

The coefficient updating circuit 72 can acquire the timing of a pulse signal generated by the firing circuit 68 via a path inside the neuron circuit 30, and can update the coefficient assigned to the synapse circuit 40 based on the acquired timing. That is, the coefficient updating circuit 72 is able to acquire the timing of a pulse signal generated by the firing circuit 68 without acquiring the timing via a path external to the neuron circuit 30. Thus, the coefficient updating circuit 72 can execute, with a simple circuit, learning processing (STDP) in which synaptic strength levels are updated in accordance with the timing of neuron firing.

Figure 4:
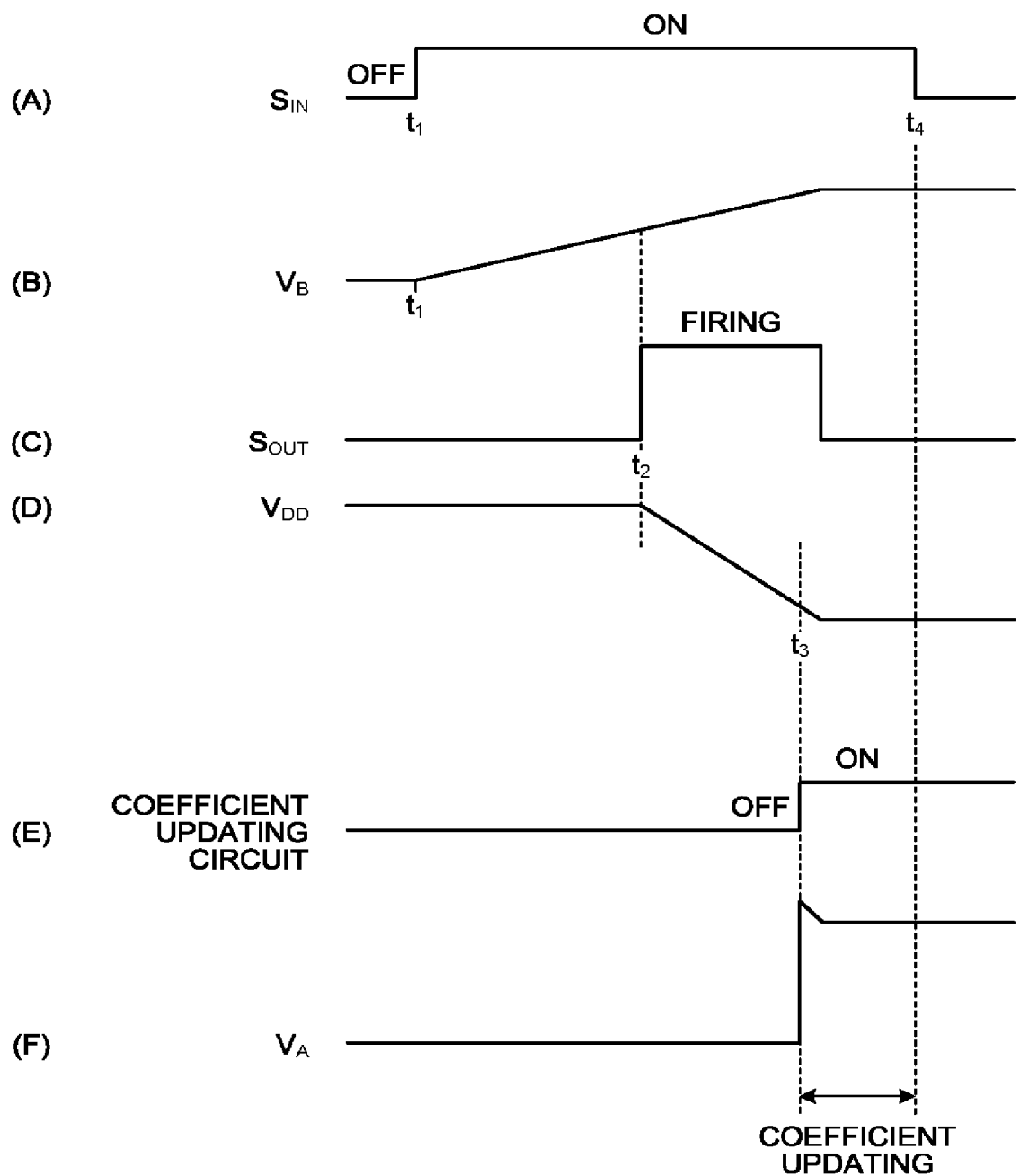
FIG. 4 is a diagram illustrating signal waveforms of the neuron circuit and the synapse circuit.

FIG. 4 is a diagram illustrating signal waveforms of the neuron circuit 30 and the synapse circuit 40.

In FIG. 4, a waveform (A) represents a switching signal ($S_{IN}$) that the synapse circuit 40 receives. A waveform (B) represents an integral signal ($V_B$) output from the integration circuit 66. A waveform (C) represents a pulse signal ($S_{OUT}$) output from the firing circuit 68. A waveform (D) represents power supply voltage ($V_{DD}$) that is output from the secondary battery 70. A waveform (E) represents how the coefficient updating circuit 72 operates. A waveform (F) represents voltage ($V_A$) at the input terminal 62.

As shown in the waveform (A) of FIG. 4, the switching signal ($S_{IN}$) to be received by one of the synapse circuits 40 changes from an OFF signal to an ON signal at a clock time $t_1$. The switching signal ($S_{IN}$) changes from an OFF signal to an ON signal at the time when, for example, a pulse signal is generated by the neuron circuit 30 of a preceding layer. When the switching signal ($S_{IN}$) is an ON signal, the switch 44 is turned on. As a result, certain voltage is applied to the resistance change memory element 42. Thus, the specified synapse circuit 40 that has received a pulse signal from the neuron circuit 30 of the preceding layer can give, as an input signal to the integration circuit 66, current obtained by multiplying the voltage applied to the resistance change memory element 42 with the conductance of the resistance change memory element 42.

Subsequently, the switching signal ($S_{IN}$) changes from an ON signal to an OFF signal at a clock time $t_4$, which is a certain time period after the clock time $t_1$. When the switching signal ($S_{IN}$) is an OFF signal, the switch 44 is turned off.

The integration circuit 66 receives, as an input signal, current obtained by multiplying voltage applied to the resistance change memory element 42 with the conductance of the resistance change memory element 42. As a result, the integration circuit 66 outputs an integral signal ($V_B$) that gradually rises from the clock time $t_1$, as shown in the waveform (B) of FIG. 4.

The firing circuit 68 fires in accordance with the integral signal ($V_B$). Specifically, the firing circuit 68 fires at the time when a value of the integral signal ($V_B$) reaches a predetermined value. Alternatively, for example, the firing circuit 68 may fire at the time when a value of the integral signal ($V_B$) exceeds a predetermined value. In the present embodiment, the firing circuit 68 generates a pulse signal ($S_{OUT}$) of a specific time width at a clock time $t_2$ that comes after the clock time $t_1$, as shown in the waveform (C) of FIG. 4.

Upon generating the pulse signal ($S_{OUT}$) by the firing circuit 68, the secondary battery 70 starts to gradually decrease the power supply voltage ($V_{DD}$). In the present embodiment, the power supply voltage ($V_{DD}$) starts the decrease at the clock time $t_2$, as shown in the waveform (D) of FIG. 4.

When the power supply voltage ($V_{DD}$) decreases to a certain threshold or less, the coefficient updating circuit 72 is turned off from being on. Upon being turned off, the coefficient updating circuit 72 disconnects the input terminal 62 from the secondary battery 70. When being on, the coefficient updating circuit 72 connects the input terminal with the secondary battery 70. In the present embodiment, at a clock time $t_3$ that comes after the clock time $t_2$, the coefficient updating circuit 72 is turned on from being off, as shown in the waveform (E) of FIG. 4. Thus, the coefficient updating circuit 72 can start to apply the power supply voltage ($V_{DD}$) to the input terminal 62 from the clock time $t_3$.

When the power supply voltage ($V_{DD}$) is applied to the input terminal 62, the power supply voltage ($V_{DD}$) is applied to the resistance change memory element 42 included in the specified synapse circuit 40 (the synapse circuit 40 in which the switch 44 is on). In the present embodiment, the power supply voltage ($V_{DD}$) is applied to the resistance change memory element 42 at a time period between the clock time $t_3$ and the clock time $t_4$, as shown in the waveform (E) of FIG. 4.

The power supply voltage ($V_{DD}$) is a large voltage sufficient to rewrite the conductance of the resistance change memory element 42. When the power supply voltage ($V_{DD}$) is applied to the input terminal 62 while the switch 44 is being on, the conductance of the resistance change memory element 42 changes. Therefore, the coefficient updating circuit 72 is able to change the conductance of the resistance change memory element 42 at the time period between the clock time $t_3$ to the clock time $t_4$, as shown in the waveform (E) of FIG. 4. That is, between the clock time t3 to the clock time t4, the coefficient updating circuit 72 updates the coefficient that has been assigned to the specified synapse circuit 40.

The neuron circuit 30 is capable of updating the coefficient assigned to the synapse circuit 40 without an additional external path for feeding the pulse signal ($S_{OUT}$) back.

When the clock time $t_3$ at which the pulse signal ($S_{OUT}$) is generated comes before the clock time $t_4$ at which the switching signal ($S_{IN}$) changes from an ON signal to an OFF signal, the coefficient updating circuit 72 updates the coefficient assigned to the specified synapse circuit 40. In contrast, when the clock time $t_3$ comes after the clock time $t_4$, the coefficient updating circuit 72 does not update the coefficient assigned to the specified synapse circuit 40. Thus, the neuron circuit 30 is capable of updating the coefficients in a manner that simulates the STDP, which is a learning rule by which synaptic strength is changed depending on the times when neuron firing occurs.

Figure 5:
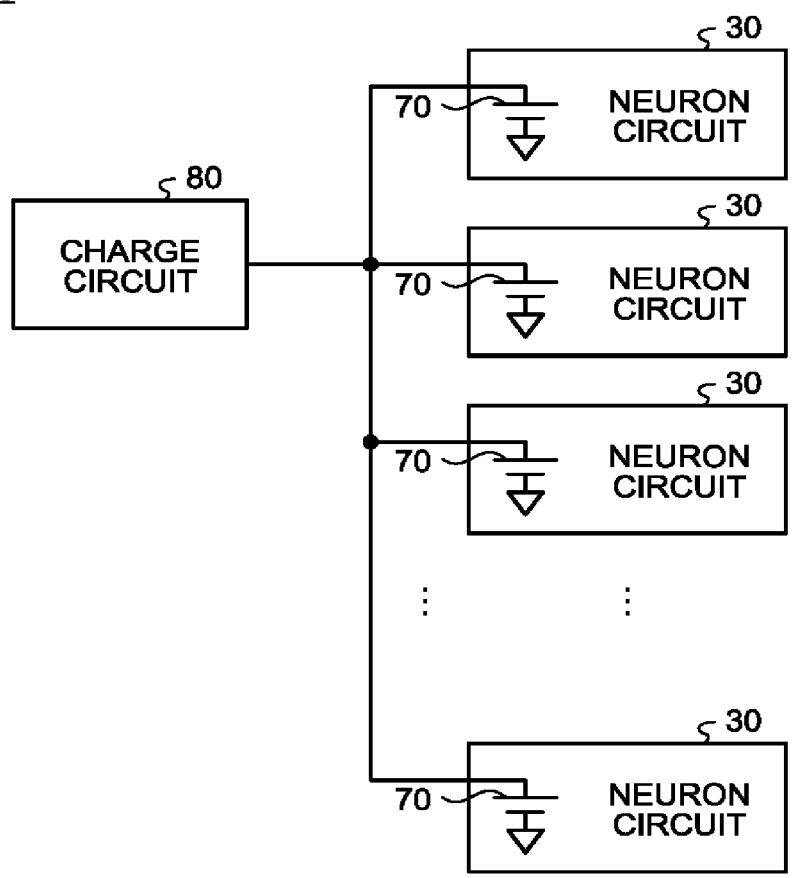
FIG. 5 is a block diagram illustrating an arithmetic operation unit including a charge circuit.

FIG. 5 is a diagram illustrating the structure of the arithmetic operation unit 20 including the charge circuit 80. The arithmetic operation unit 20 further includes the charge circuit 80. The charge circuit 80 is provided in common to the plurality of neuron circuits 30.

The charge circuit 80 charges the respective secondary batteries 70 included in the plurality of neuron circuits 30. For example, the charge circuit 80 charges each of the secondary batteries 70 on a regular basis. Thus, even when electric power is consumed for generating the pulse signal, the secondary battery 70 can newly accumulate electric power therein. This enables the neuron circuits 30 to perform operations repeatedly.

As described above, in the neural network apparatus 10 according to the present embodiment, each of the plurality of neuron circuits 30 includes the corresponding secondary battery 70. Thus, the neural network apparatus 10 is capable of holding energy sources in a form similar to neurons of a human body.

Furthermore, in the neural network apparatus 10 according to the present embodiment, each of the neuron circuits 30 updates, in accordance with decrease in power supply voltage output by the corresponding secondary battery 70, the coefficient that has been assigned to the specified synapse circuit 40 having given the input signal. Thus, without feedback paths apart from the neuron circuits 30, the neural network apparatus 10 is capable of providing feedback of the timing of the neuron firing to the synapse circuits 40 and updating the assigned coefficients.

Figure 6:
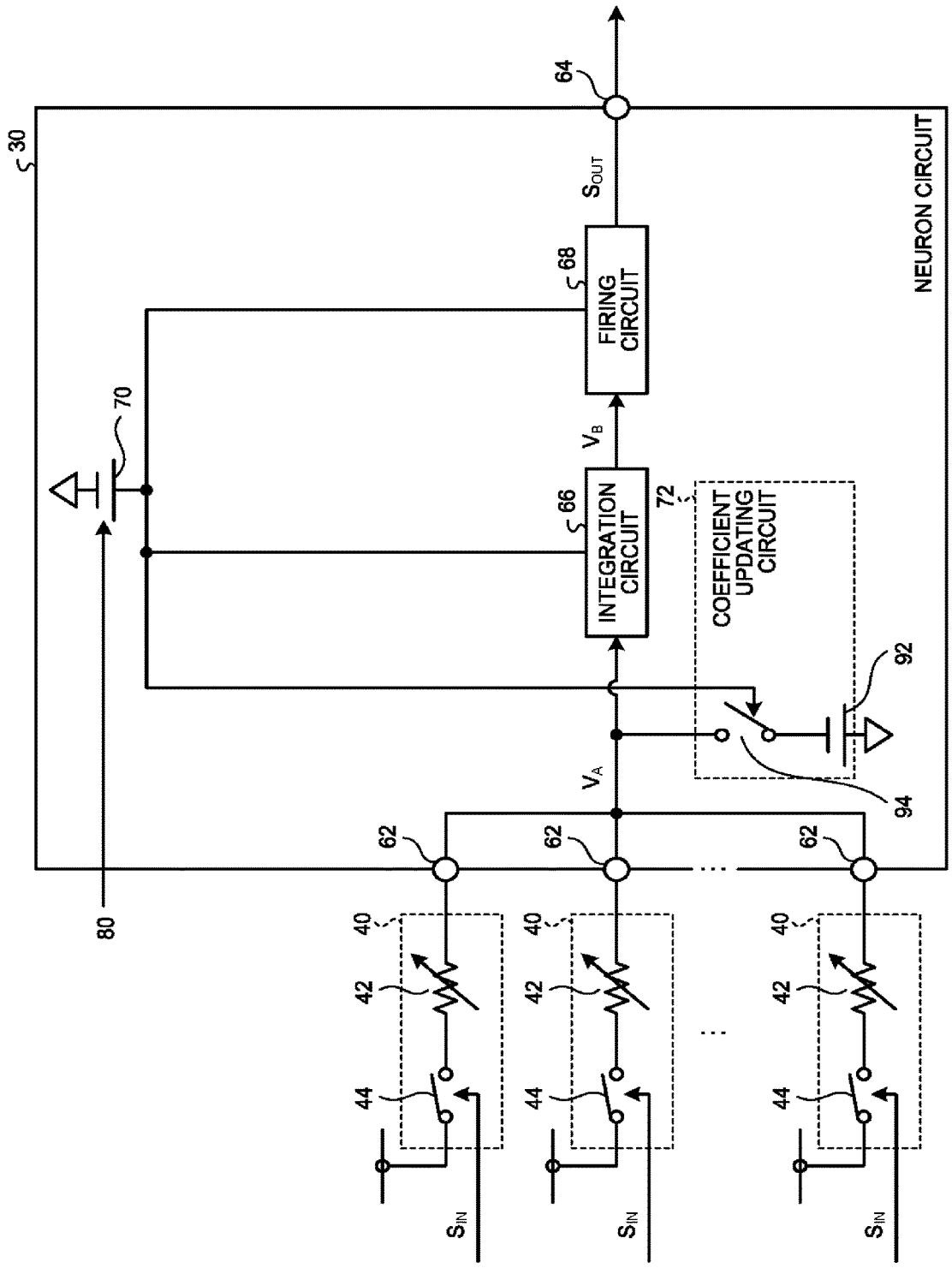
FIG. 6 is a block diagram illustrating a neuron circuit and synapse circuits according to a modification of the embodiment.

FIG. 6 is a diagram illustrating a circuit structure of the neuron circuit 30 according to a modification of the embodiment and the two or more synapse circuits 40 connected to the neuron circuit 30 according to the modification.

In the neuron circuit 30 according to the modification, the coefficient updating circuit 72 has a different structure from the circuit structure illustrated in FIG. 3. Part of description about the neuron circuit 30 according to the modification, which is identical to the circuit illustrated in FIG. 3, is omitted.

The coefficient updating circuit 72 according to the modification includes an internal secondary battery of updating-circuit 92 and an internal switch of updating-circuit 94. The internal secondary battery of updating-circuit 92 internally accumulates electric power and generates voltage. The internal secondary battery of updating-circuit 92 accumulates electric power sufficient to change the conductance of the resistance change memory element 42. The internal secondary battery of updating-circuit 92 may have the same structure as the secondary battery 70. The internal secondary battery of updating-circuit 92 may be charged by the external charge circuit 80 as in the case of the secondary battery 70.

Note that the internal secondary battery of updating-circuit 92 is connected to the reference potential (for example, the ground) with polarity opposite to that of the secondary battery 70. Therefore, the internal secondary battery of updating-circuit 92 generates voltage that is negative with respect to the power supply voltage.

When the power supply voltage generated by the secondary battery 70 is less than or equal to a predetermined threshold or is greater than or equal to a predetermined threshold, the internal switch of updating-circuit 94 applies the voltage generated by the internal secondary battery of updating-circuit 92 to the resistance change memory element 42 included in the specified synapse circuit 40. Specifically, when the power supply voltage is less than or equal to a predetermined threshold or is greater than or equal to a predetermined threshold, the internal switch of updating-circuit 94 short-circuits the voltage generating terminal of the internal secondary battery of updating-circuit 92 and the input terminal 62.

On the other hand, when the power supply voltage is greater than a predetermined threshold or is less than a predetermined threshold, the internal switch of updating-circuit 94 disconnects the resistance change memory element 42 in the specified synapse circuit 40 from the internal secondary battery of updating-circuit 92. Specifically, when the power supply voltage generated by the secondary battery 70 is greater than a predetermined threshold or is less than a predetermined threshold, the internal switch of updating-circuit 94 disconnects the input terminal 62 from the voltage generating terminal of the internal secondary battery of updating-circuit 92.

The internal switch of updating-circuit 94 that operates in the above-described manner can be implemented by, for example, connecting the source/drain of an MOS-FET to the voltage generating terminal of the internal secondary battery of updating-circuit 92 and the input terminal 62 and also connecting the gate of the MOS-FET to the power supply voltage of the secondary battery 70.

FIG. 7 is a diagram illustrating signal waveforms of the neuron circuit 30 and the synapse circuit 40 according to the modification.

Signal waveforms (A) to (D) in FIG. 7 are the same as those in FIG. 4. The waveform (E) in FIG. 7 represents operation of the internal switch of updating-circuit 94 included in the coefficient updating circuit 72. The waveform (F) in FIG. 7 represents voltage ($V_A$) at the input terminal 62.

The internal switch of updating-circuit 94 in the coefficient updating circuit 72 is turned on from being off when the power supply voltage ($V_{DD}$) generated by the secondary battery 70 decreases to a certain threshold or less. When being off, the internal switch of updating-circuit 94 disconnects the input terminal 62 from the internal secondary battery of updating-circuit 92. When being on, the internal switch of updating-circuit 94 connects the input terminal 62 to the internal secondary battery of updating-circuit 92. In this example, the internal switch of updating-circuit 94 is turned on from being off at the clock time $t_3$, as shown in the waveform (E) of FIG. 7.

In this example, the internal secondary battery of updating-circuit 92 generates negative voltage whose polarity is opposite to that of the power supply voltage ($V_{DD}$). Thus, at the clock time $t_3$, the internal switch of updating-circuit 94 can start to apply, to the input terminal 62, the negative voltage generated by the internal secondary battery of updating-circuit 92.

When the negative voltage generated by the internal secondary battery of updating-circuit 92 is applied to the input terminal 62, the negative voltage is applied to the resistance change memory element 42 in the specified synapse circuit 40 (the synapse circuit 40 in which the switch 44 is on). In this example, the negative voltage is applied to the resistance change memory element 42 at a time period between the clock time $t_3$ and the clock time $t_4$, as shown in the waveform (F) of FIG. 7.

The negative voltage generated by the internal secondary battery of updating-circuit 92 has a level capable of rewriting the conductance of the resistance change memory element 42. Thus, when the negative voltage generated by the internal secondary battery of updating-circuit 92 is applied to the input terminal 62 while the switch 44 is being on, the conductance of the resistance change memory element 42 changes. Therefore, the coefficient updating circuit 72 is able to change the conductance of the resistance change memory element 42 at the time period between the clock time $t_3$ and the clock time $t_4$, as shown in the waveform (F) of FIG. 7. That is, at the time period between the clock time $t_3$ and the clock time $t_4$, the coefficient updating circuit 72 updates the coefficient assigned to the specified synapse circuit 40.

Accordingly, the neuron circuit 30 according to modification is able to update the coefficients assigned to the associated synapse circuits 40 without an additional external path for feeding the pulse signal ($S_{OUT}$) back.

The neuron circuit 30 according to the modification acquires, via the internal path, the timing of the pulse signal generated by the firing circuit 68 and updates the coefficient assigned to the specified synapse circuit 40 based on the acquired timing. The neuron circuit 30 according to the modification can acquire the timing of a pulse signal generated by the firing circuit 68 without using a path external to the neuron circuit 30. Therefore, the coefficient updating circuit 72 according to the modification is capable of executing, with a simple circuit, learning processing (STDP) in which synaptic strength is updated in accordance with the timing of neuron firing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A neural network apparatus comprising
a plurality of neuron circuits, each including:
an integration circuit configured to output an integral signal obtained by integrating input signals, each input signal having a value obtained by multiplying a pulse signal generated from a neuron circuit provided at a preceding layer and a coefficient;
a firing circuit configured to generate, in accordance with the integral signal, the pulse signal to be transmitted to a neuron circuit provided at a subsequent layer;
a secondary battery configured to supply the firing circuit with drive electric power used for generating the pulse signal from the firing circuit; and
a coefficient updating circuit configured to update, in accordance with an increase or a decrease of a power supply voltage of the secondary battery, a coefficient corresponding to the input signal.

2. The apparatus according to claim 1, further comprising a plurality of synapse circuits, wherein
each of the plurality of neuron circuits
is provided in association with two or more of the plurality of synapse circuits, and
acquires, from the two or more of the plurality of synapse circuits, two or more of the input signals, and
each of the two or more of the plurality of synapse circuits is assigned the coefficient, receives the pulse signal generated by one of the plurality of neuron circuits, which is provided at a preceding layer, generates the input signal having a value obtained by multiplying the received pulse signal and the assigned coefficient, and gives the generated input signal to the corresponding neuron circuit.

3. The apparatus according to claim 2, wherein the integration circuit integrates the two or more input signals acquired from the two or more of the plurality of synapse circuits that are provided in association with the integration circuit.

4. The apparatus according to claim 1, further comprising a charge circuit configured to charge the individual secondary batteries included in the plurality of neuron circuits.

5. The apparatus according to claim 4, wherein the charge circuit charges the individual secondary batteries on a regular basis.

6. A neural network apparatus comprising:

a plurality of neuron circuits; and a plurality of synapse circuits, wherein each of the plurality of neuron circuits is provided in association with two or more of the plurality of synapse circuits, and acquires, from the two or more of the plurality of synapse circuits associated, two or more input signals;

each of the two or more of the plurality of synapse circuits is assigned a coefficient, receives a pulse signal generated by one of the plurality of neuron circuits, which is provided at a preceding layer, generates an input signal having a value obtained by multiplying the received pulse signal and the assigned coefficient, and gives the generated input signal to a corresponding neuron circuit; and each of the plurality of neuron circuits comprises:

an integration circuit configured to output an integral signal obtained by integrating two or more of the input signals obtained from the two or more of the plurality of synapse circuits associated;

a firing circuit configured to generate, in accordance with the integral signal, the pulse signal to be transmitted to a neuron circuit provided at a subsequent layer;

a secondary battery configured to supply the firing circuit with drive electric power used for generating the pulse signal from the firing circuit; and a coefficient updating circuit, wherein a power supply voltage generated by the secondary battery decreases when the pulse signal is output from the firing circuit, and the coefficient updating circuit is configured to update, in accordance with the decrease of the power supply voltage, the coefficient assigned to a specified synapse circuit, which is one of the two or more of the plurality of synapse circuits and has given the input signal to the corresponding neuron circuit.

7. The apparatus according to claim 6, wherein, when the power supply voltage is less than or equal to a predetermined threshold or is greater than or equal to a predetermined threshold, the coefficient updating circuit updates the coefficient assigned to the specified synapse circuit.

8. The apparatus according to claim 6, wherein, when the power supply voltage is less than or equal to a predetermined threshold or is greater than or equal to a predetermined threshold, the coefficient updating circuit applies the power supply voltage to the specified synapse circuit.

9. The apparatus according to claim 6, wherein the coefficient updating circuit includes an internal secondary battery of updating-circuit, and applies voltage to the specified synapse circuit when the power supply voltage is less than or equal to a predetermined threshold or is greater than or equal to a predetermined threshold, the voltage having been generated by the internal secondary battery of updating-circuit.

10. The apparatus according to claim 6, wherein each of the synapse circuits includes a resistance change memory element, whose conductance changes in accordance with applied voltage, the conductance of the resistance change memory element represents the coefficient, the resistance change memory element is given voltage at a timing of the pulse signal generated by the neuron circuit of a preceding layer, and each of the plurality of synapse circuits applies, as the input signal to the corresponding neuron circuit, current that flows through the resistance change memory element.

11. The apparatus according to claim 10, wherein, when the power supply voltage is less than or equal to a predetermined threshold or is greater than or equal to a predetermined threshold, the coefficient updating circuit applies, to the resistance change memory element included in the specified synapse circuit, the power supply voltage generated by the secondary battery, and, when the power supply voltage is greater than a predetermined threshold or is less than a predetermined threshold, the coefficient updating circuit disconnects the resistance change memory element in the specified synapse circuit from the secondary battery.

12. The apparatus according to claim 10, wherein the coefficient updating circuit includes an internal secondary battery of updating-circuit, when the power supply voltage is less than or equal to a predetermined threshold or is greater than or equal to a predetermined threshold, the coefficient updating circuit applies, to the resistance change memory element in the specified synapse circuit, voltage generated by the internal secondary battery of updating-circuit, and, when the power supply voltage is greater than a predetermined threshold or is less than a predetermined threshold, the coefficient updating circuit disconnects the resistance change memory element in the specified synapse circuit from the internal secondary battery of updating-circuit.

13. A coefficient updating method comprising:

updating a coefficient of a neural network apparatus comprising a plurality of neuron circuits, wherein each of the plurality of neuron circuits comprises:

an integration circuit configured to output an integral signal obtained by integrating input signals, each input signal having a value obtained by multiplying a pulse signal generated from a neuron circuit provided at a preceding layer and a coefficient;

a firing circuit configured to generate, in accordance with the integral signal, the pulse signal to be transmitted to a neuron circuit provided at a subsequent layer; and a secondary battery configured to supply the firing circuit with drive electric power used for generating the pulse signal from the firing circuit, and the method comprises:

updating, in accordance with an increase or a decrease of a power supply voltage of the secondary battery, a coefficient corresponding to the input signal.

\* \* \* \* \*